Figure 1:
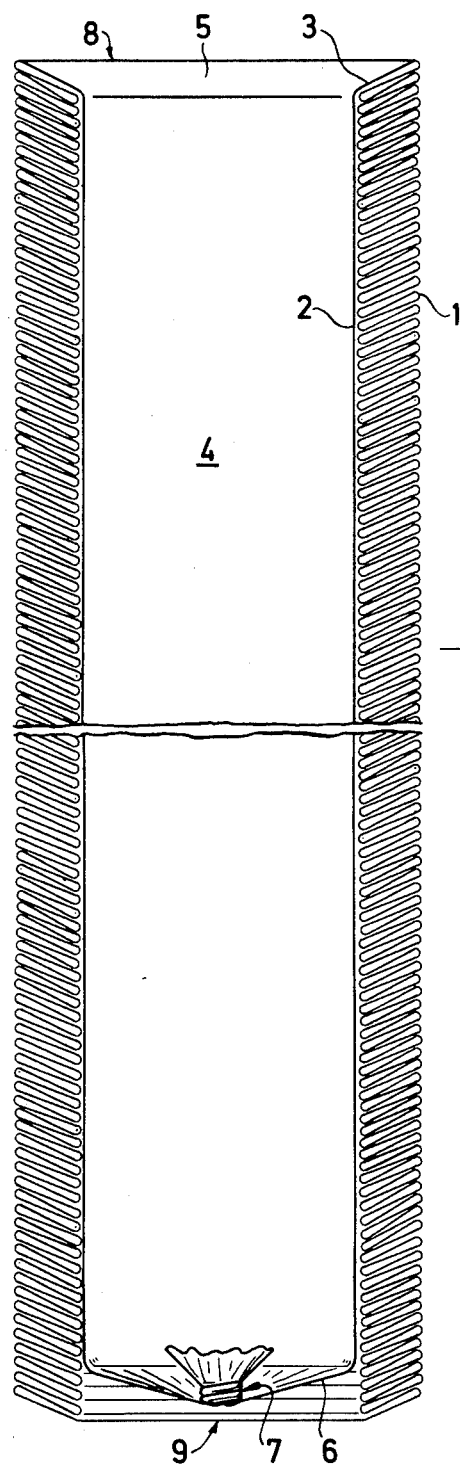

United States Patent [19]

Köstner et al.

[11] 4,273,551

[45] Jun. 16, 1981

[54] DOUBLE-WALLED HOLLOW ROD OF FLEXIBLE TUBULAR MATERIAL

[75] Inventors: Armin Köstner, Wiesbaden; Richard Lenhart, Wiesbaden-Frauenstein; Klaus-Jürgen Bittner, Wiesbaden, all of Fed. Rep. of Germany

[73] Assignee: Hoechst Aktiengesellschaft, Fed. Rep. of Germany

[21] Appl. No.: 914,158

[22] Filed: Jun. 9, 1978

Related U.S. Application Data

[63] Continuation-in-part of Ser. No. 413,622, Nov. 7, 1973, abandoned.

[30] Foreign Application Priority Data

Nov. 9, 1972 [DE] Fed. Rep. of Germany ....... 2254731

[51] Int. Cl.³ .............................................. A22C 13/00
[52] U.S. Cl. .................... 493/243; 493/267; 493/455
[58] Field of Search .......................... 93/84 TW, 94 R; 426/140, 138; 206/80 Z; 17/33, 34, 35; 53/451, 469, 558

[56] References Cited

U.S. PATENT DOCUMENTS

| 3,868,895 | 3/1975 | Hart et al. ......................... 93/84 TW |
| 3,971,301 | 7/1976 | Becker et al. ..................... 93/84 TW |
| 4,007,761 | 2/1977 | Beckman ............................. 17/33 X |
| 4,075,938 | 2/1978 | Martinek ........................... 93/84 TW |

*Primary Examiner*—James F. Coan
*Attorney, Agent, or Firm*—James E. Bryan

[57] ABSTRACT

This invention relates to a stiff tubular hollow rod, said rod being substantially double-walled over its entire length and comprising one single length of flexible tubing, the wall of which is substantially free of openings and at least one of the surfaces of the tubing is provided with a coating, said rod comprising a shirred outer tube and an inner tube substantially free of folds arranged in the hollow space of said shirred outer tube constituting the casing for the inner tube, the inner tube being joined to the shirred outer tube at one of its ends and sealed at the other. The invention also relates to processes for making said hollow double-walled tubular rod of flexible tubing and to a sausage produced using said hollow tubular rod of flexible tubing.

4 Claims, 2 Drawing Figures

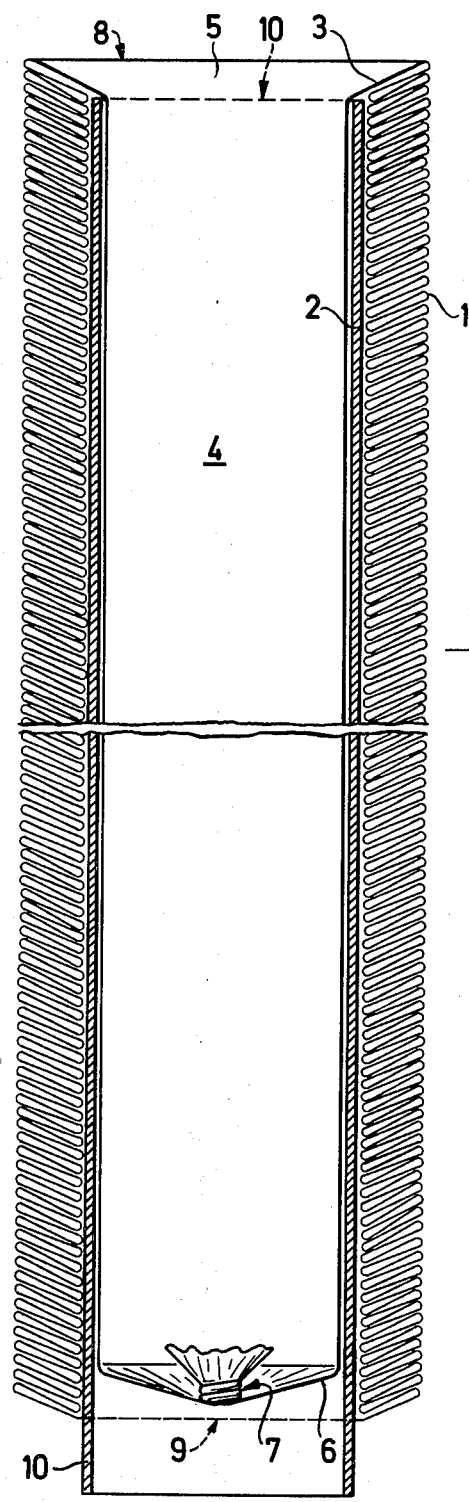

DOUBLE-WALLED HOLLOW ROD OF FLEXIBLE TUBULAR MATERIAL

This application is a continuation-in-part of application Ser. No. 413,622, filed Nov. 7, 1973.

The present invention relates to a mechanically stiff double-walled tubular hollow rod comprising one single length of flexible tubing the wall of which is substantially free from openings. At least one of the surfaces of the tubing is provided with a coating.

The invention also relates to processes for the manufacture of a rod of the invention and to the use of the rod of the invention in the manufacture of tubular packaging containing a pasty filling, especially sausage manufacture.

Tubular sleeves which have been shirred by folding and compression to give the so-called "sticks" are already used in sausage manufacture. These shirred sticks are essentially single-walled over their entire length. As the shirred stick is filled, for example with a sausage composition, it unfolds itself. Generally, the shirred stick will have an end seal. Preferred materials for such shirred sticks are synthetic polymeric materials, papers impregnated and coated with suitable polymeric material or, especially, cellulose hydrate.

In the manufacture of the known shirred sticks, it is customary to use tubings having on at least one of its surfaces a coating, for example chemical lubricating agent, on the inner surface of the tube before shirring in order to facilitate the formation of folds during the shirring process. The chemical lubricating agent remains on the inner surface of the stick after shirring. There is therefore a danger that lubricant subsequently can mix with the contents of the tube, with possible adverse effect.

Because of their method of manufacture, cellulose hydrate tubes have a smoother, less structured, surface on the outside than on the inside. When such shirred sticks are filled, therefore, the contents tend to adhere to the structured inner surface of the tube. This is particularly likely to occur in sausage manufacture when a meaty filling is used; the sausage skin cannot be completely detached from its contents.

In the manufacture of the known shirred sticks it is further known to use a tubing having on at least one of its surfaces a coating consisting of polymeric material.

The mechanically stiff tubular double-walled hollow rod according to the invention includes a tightly shirred outer tube and a tube which is free from folds and is arranged in the hollow space of said shirred outer tube, said shirred outer tube constituting a casing for said tube free from folds.

The length of the tube free from folds being arranged in the hollow space of the casing formed by the shirred outer tube corresponds essentially to the length of said shirred outer tube.

The tube free from folds is arranged in the hollow space of the casing in such a manner that its outside is directly adjacent to the inside of the casing. One of the ends of the tube free from folds is integral with the shirred outer tube. The two coherent parts of the rod are joined only in the region of transition. The free end of the unfolded tube is sealed; said seal is located within the hollow space of the shirred outer tube and does not project from the latter.

The tubing forming the rod of the invention preferably is composed of paper impregnated with polymeric material, especially fiber-reinforced cellulose hydrate. The coating provided on the tube may, e.g., consist of oil or of a synthetic polymer, e.g., a vinylidene chloride copolymer or a cationic thermosetting resin. Tubes of cellulose hydrate which are preferably fiber-reinforced and one surface of which is coated with a vinylidene chloride copolymer or a waterinsoluble resin from the group of the reaction products of epichlorhydrin and polyamine-polyamide and reactions products of melamine and formaldehyde or urea and formaldehyde have been previously proposed and are, as such, not a subject matter of the present invention.

A tube suitable for the manufacture of the rod of the invention may, for example, be a fiber-reinforced cellulose hydrate tube which has a coating of a cationic resin, e.g., a reaction product of epichlorhydrin and polyamine-polyamide, on its outside and is, on the inside, coated with oil serving as a lubricant.

By the direct contact between the outside surface of the tube free from folds and the inside surface of the shirred outer tube a frictional contact is produced between the two surfaces.

The wall of the film tube forming the double-walled tubular hollow rod has no openings through wich any liquid or a pasty or fluid or granular filling might escape. This means that the wall of the film tube is physically homogeneous and uninterrupted.

The terms "mechanical stiffness" and "mechanical stability" are meant to denote the same physical fact.

The mechanical stability of the shirred outer tube—constituting a casing for the tube free from folds arranged in its cavity—ensures the mechanical stiffness of the double-walled tubular rod.

"Shirred stick" stands for the starting product used for the manufacture of the rod according to the invention. The shirred stick is manufactured by lengthwise shirring a flexible tube of a certain length, the wall of which is substantially free from openings and which is provided with a coating on at least one side. The shirred stick is uniformly and tightly shirred and characterized by mechanical stiffness.

Processes for the lengthwise shirring of flexible tubes and devices for the performance of such processes have been previously proposed and are not a subject matter of the present invention.

The terms "mechanically stiff" or "of high mechanical stability" are used to, e.g., characterize a hollow double-walled rod or the shirred stick—forming an integral part of this rod—, resp., having a length of about 50 cm and manufactured by lengthwise shirring a tube of about 50 m length, which rod does not bend under the load of its own weight, when held at one end with its longitudinal axis extending horizontally.

It is a characterizing feature of the casing comprising the shirred outer tube of the double-walled tubular rod that it is uniformly and tightly shirred and has a main fold, the edge of which extends along an imaginary line around the circumference of the casing; between neighboring sections of the main fold secondary folds are arranged which are formed automatically by the shirring procedure. By a tightly folded, lengthwise shirred stick a shirred stick is to be understood which is reduced in length in a ratio of from 1:70 up to 1:100, as compared to the initial tube from which it has been manufactured by lengthwise shirring.

The invention further provides a process for the manufacture of a rod according to the invention, which comprises the steps of:

(a) fitting a shirred stick of flexible tubing having a coating on at least one of its surfaces over a hollow former or inserting the hollow former into the shirred stick, (b) sealing one end of the stick, for example, by partially unfolding the stick in the region of one end and gathering together the material at the end of the stick to form a seal, (c) pushing the sealed end of the shirred stick into the central orifice of the hollow former until the sealed end within the former is approximately inside the other end of the stick which lies on the outside of the former, such that a double-walled rod is formed, and (d) withdrawing the double-walled rod from the former in the direction opposite to the direction in which the sealed end of the stick was pushed into the central orifice of the former.

In a modification of this process, steps (a) and (b) may be reversed.

In a modification of the inventive process for the manufacture of the double-walled hollow rod the seal is first formed on the deshirred length of the shirred stick according to the first alternative of the process, and the deshirred tube is then introduced directly into the cavity of the hollow stick while simultaneously turning the tube "inside out" and pushing it forward up to the opposite end of the hollow stick. Inserting the sealed and inverted deshirred length of tube into the cavity of the hollow stick and pushing it forward therein may be performed with the aid of a suitably designed stamp-like tool which is subsequently retracted from the double-walled hollow rod. The tool is shaped and dimensioned in such a manner that the tube which is free from folds and is in the cavity of the shirred stick has a circular cross-section.

During the process the tubing forming the shirred stick is turned "inside out", so that, if the tubing having a chemical lubricating agent on its inside surface was used for producing the shirred stick, the lubricant is present on the outer wall of the inner tube being from folds and the inner wall of the shirred outer tubing constituting a casing for the inner tube.

If the rod is of cellulose hydrate, the smoother, less structured side is the inner side of the inner tube and the outer side of the outer tube. Thus two major disadvantages of the known sticks—contamination of the contents with lubricant and adhesion of the contents of the walls of the casings—are not possessed by the rod according to the invention. The rod is also less delicate, when used with automatic filling machines, than are known sticks.

If the used shirred stick comprises a tubing with a coating on its outer surface consisting of example of vinylidene chloride copolymer or a waterinsoluble resin from the group of the reaction products of epichlorhydrin and polyamine-polyamide and reaction products of melamine and formaldehyde or urea and formaldehyde, during the process the tubing forming the shirred stick is turned "inside out" so that the coating is on the inner wall of the tube free from folds arranged in the hollow space of the shirred tubing constituting a casing for said inner tube.

The former used is generally a cylindrical hollow rod open at least at one end, and may, for example, be made of metal. A hollow mandrel or sleeve of the type used in shirring is suitable. The former has an outer diameter slightly smaller than the inner diameter of the shirred stick. The length of the former corresponds essentially to the length of the shirred stick.

The procedure is now described in greater detail, by way of example only:

A shirred stick, which is known per se, is pushed over a hollow former. The folds of the stick are then in part opened out, at one end of the stick, by drawing apart. The piece of tube which is free of folds is gathered together to form a seal. The stick sealed at one end is now pushed, by its orifice, over the former. If the hollow mandrel used for shirring serves as the former, it is not necessary to push the stick onto a special former. The seal of the stick is introduced into the orifice of the former which adjoins the seal and is pushed forward into the bore of the former until it lies within the former near the other end of the stick. The gathered end section is pushed into and through the former by, for example, a ram which is again retracted after the pushing-in sequence.

The double-walled rod formed by the measures described above is then pushed off the former, in the opposite direction to that in which the seal was pushed into the former. The seal is located within the shirred outer tube and does not project from the latter.

According to a modification of the process for producing the inventive rod the modified process comprises the steps of:

(a) partly deshirring one end of the shirred stick, (b) sealing the free end of the deshirred length of the tubing, and (c) introducing the sealed length of tubing into the orifice of the hollow space of the shirred stick and pushing the seal forward up to the end of said hollow space such that a mechanically stiff tubular hollow rod is formed which is double-walled over its entire length.

The seal can be made by all known manners, for example by clipping.

The present invention further provides a process for the manufacture of a tubular packaging filled with pasty material which comprises the steps of (a) positioning a filling tube of a filling device inside the inner tube of a rod according to the invention or positioning the rod around the filling tube, such that the filling tube adjoins the seal of the rod, and (b) feeding pasty material from the filling device via the filling tube into the rod.

The pasty material may be a substance intended for a technical use, for example, putty, or a foodstuff, in particular a sausage composition.

When filling the contents into tubes, serving for the manufacture of tubular packagings, on automatic filling machines, it is advantageous to use sticks which are sealed at one end. While in the course of filling conventional single-walled shirred sticks sealed at one end, the unfolding of the shirred stick caused by the pressure exerted in introducing the contents starts from the end at which there is the end seal; the unfolding in the case of the double-walled rod according to the invention takes place in such a way that the unfolding during filling starts from the end of the stick corresponding to the orifice of the rod.

The use of the rod according to the invention is described in further detail, by way of example only, with reference to the production of sausages:

The rod, composed of fiber-reinforced cellulose hydrate film tubing is pushed over the filling tube of a known sausage filling device in such a way that the filling tube enters the cavity of the inner tube of the rod, and the rod is pushed over the filling tube of the sausage filling device to the point that the orifice of the filling tube comes to be approximately in the vicinity of the seal of the inner tube of the rod. Meat emulsion is then continuously pressed into the inner cavity of the rod through the filling tube of the sausage filling machine. As a result of the pressure exerted by the sausage emulsion on the sealed end of the inner tube of the rod, the inner tube is progressively pushed forward in accordance with the sausage emulsion pressed into the filling space of the rod and in doing so the shirred, outer tube is necessarily progressively unfolded.

As a result of its peculiar structure the double-walled hollow rod possesses particularly high inherent mechanical stability or stiffness and is therefore less sensitive to mechanical flexural stress in use than are the known shirred sticks.

The invention will be further illustrated by reference to the accompanying drawings in which FIG. 1 is an axial cross-section of a rod according to the invention, and FIG. 2 is a perspective view of a former employed in producing the rod of FIG. 1.

The double-walled rod is composed of a shirred outer tube 1 and an inner tube 2 free of folds, the shirred outer tube 1 constituting a casing of the inner tube 2 in its hollow space; 1 and 2 are made from a single piece of tubing having on at least one surface a coating, with a transition zone 3 between them. The rod has a cavity 4 for filling, a filling orifice 5 at its first end 8, and a seal 6, made from a gathering 7 of the second end 9 of the inner tube 2.

There is no firm connection between the inner tube 2 and the shirred outer tube 1; these two coherent parts of the rod are joined only in the region of the transition 3 from the shirred outer tube to the inner tube of the rod, which is not shirred in the region of the orifice of the rod.

The rod according to the invention, which is produced from the shirred stick, is accordingly only slightly shorter than the initial length of the shirred stick.

The former is a cylindrical hollow rod 10 which is open at both ends. Its outer diameter is slightly smaller than the inner diameter of the shirred outer tube 1 in FIG. 1; its length corresponds essentially to the length of the double-walled rod of FIG. 1.

It will be obvious to those skilled in the art that many modifications may be made within the scope of the present invention without departing from the spirit thereof, and the invention includes all such modifications.

What is claimed is:

1. A process for the manufacture of a hollow tubular rod of flexible tubing having a coating on at least one of its surfaces which comprises:
    (a) fitting a shirred stick of flexible tubing having a coating on at least one of its surfaces over a hollow former,
    (b) sealing one end of the stick,
    (c) pushing the sealed end of the shirred stick into the central orifice of the hollow former until the sealed end within the former is approximately inside the other end of the stick which lies on the outside of the former, such that a double-walled rod is formed, and
    (d) withdrawing the double-walled rod from the former in the direction opposite to the direction in which the sealed end of the stick was pushed into the central orifice of the former.

2. A process as claimed in claim 1 wherein step (b) comprises partially unfolding the stick in the region of one end, and gathering together the material at the end of the stick to form a seal.

3. A process for the manufacture of a hollow tubular rod of flexible tubing having a coating on at least one of its surfaces which comprises:
    (a) fitting a shirred stick of flexible tubing having a coating on at least one of its surfaces and one end sealed over a hollow former,
    (b) pushing the sealed end of the shirred stick into the central orifice of the hollow former until the sealed end within the former is approximately inside the other end of the stick which lies on the outside of the former, such that a double-walled rod is formed, and
    (c) withdrawing the double-walled rod from the former in the direction opposite to the direction in which the sealed end of the stick was pushed into the central orifice of the former.

4. A process for the manufacture of a hollow tubular rod of flexible tubing having a coating on at least one of its surfaces which comprises:
    (a) fitting a shirred stick of flexible tubing having a coating on at least one of its surfaces over a hollow former,
    (b) partially deshirring the shirred stick at one of its ends,
    (c) sealing the free end of the deshirred length of tubing, and
    (d) introducing the sealed length of tubing into the orifice of the hollow space of the shirred stick and pushing the seal forward up to the end of said hollow space such that a mechanically stiff hollow tubular rod is formed, which is double-walled over its entire length.

* * * * *